G. H. DEATON.
RECORD CALENDAR.
APPLICATION FILED AUG. 3, 1918.
1,368,905.
Patented Feb. 15, 1921.
4 SHEETS—SHEET 1.
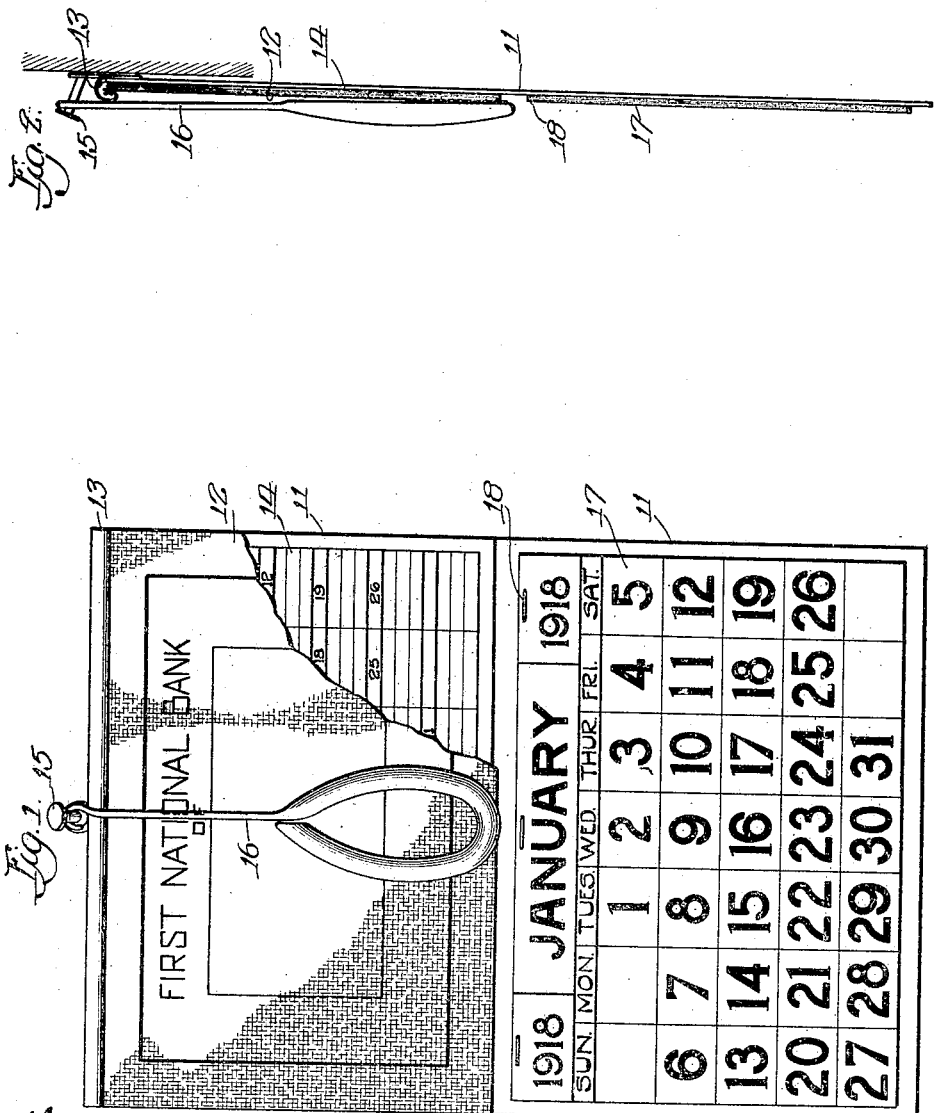

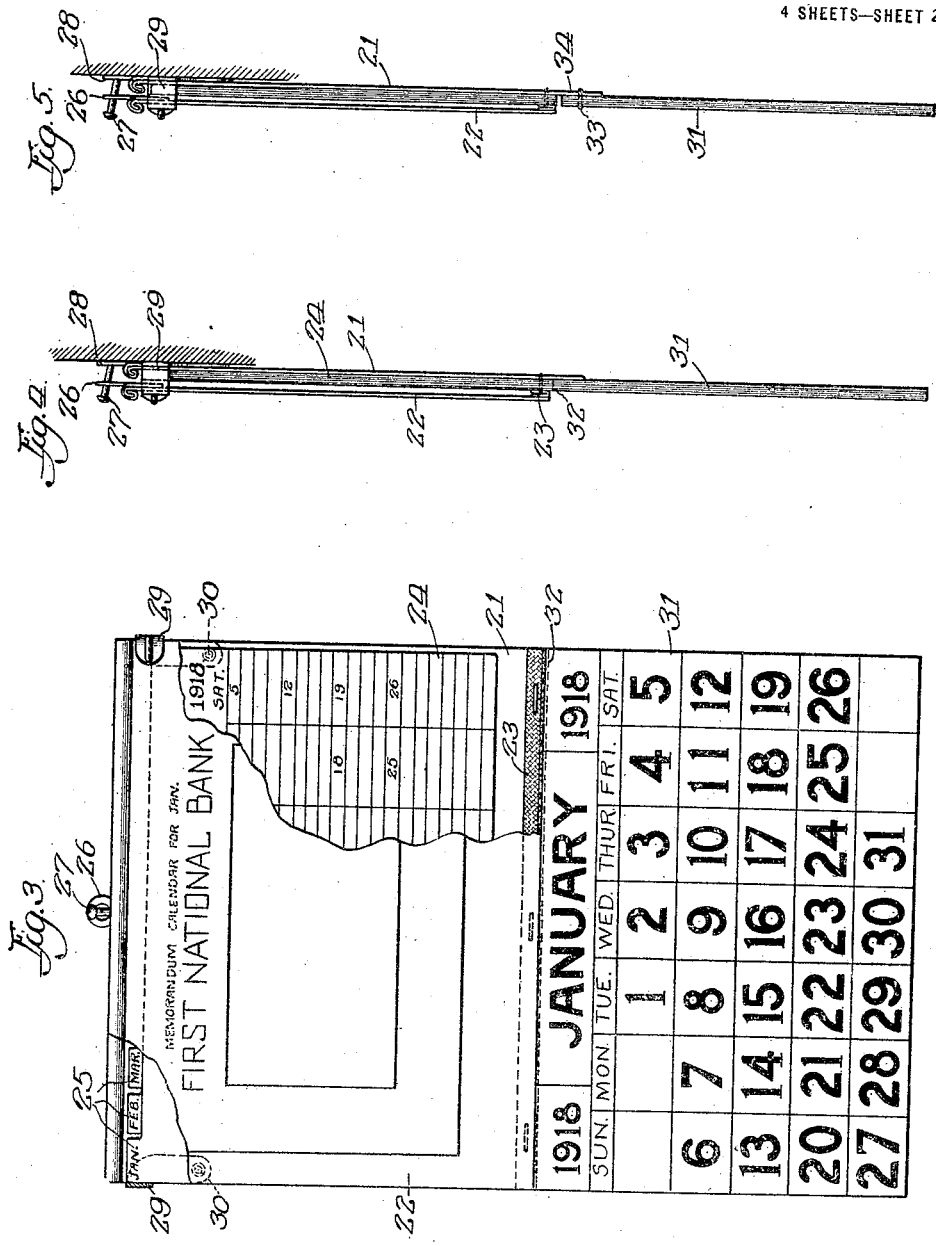

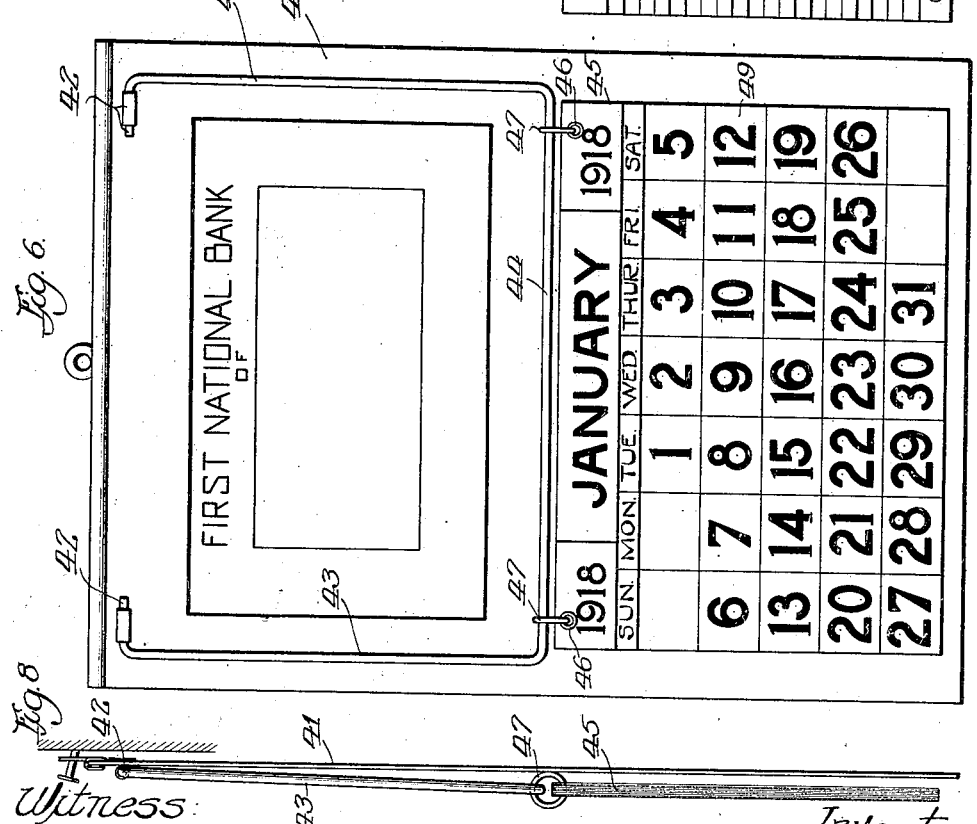

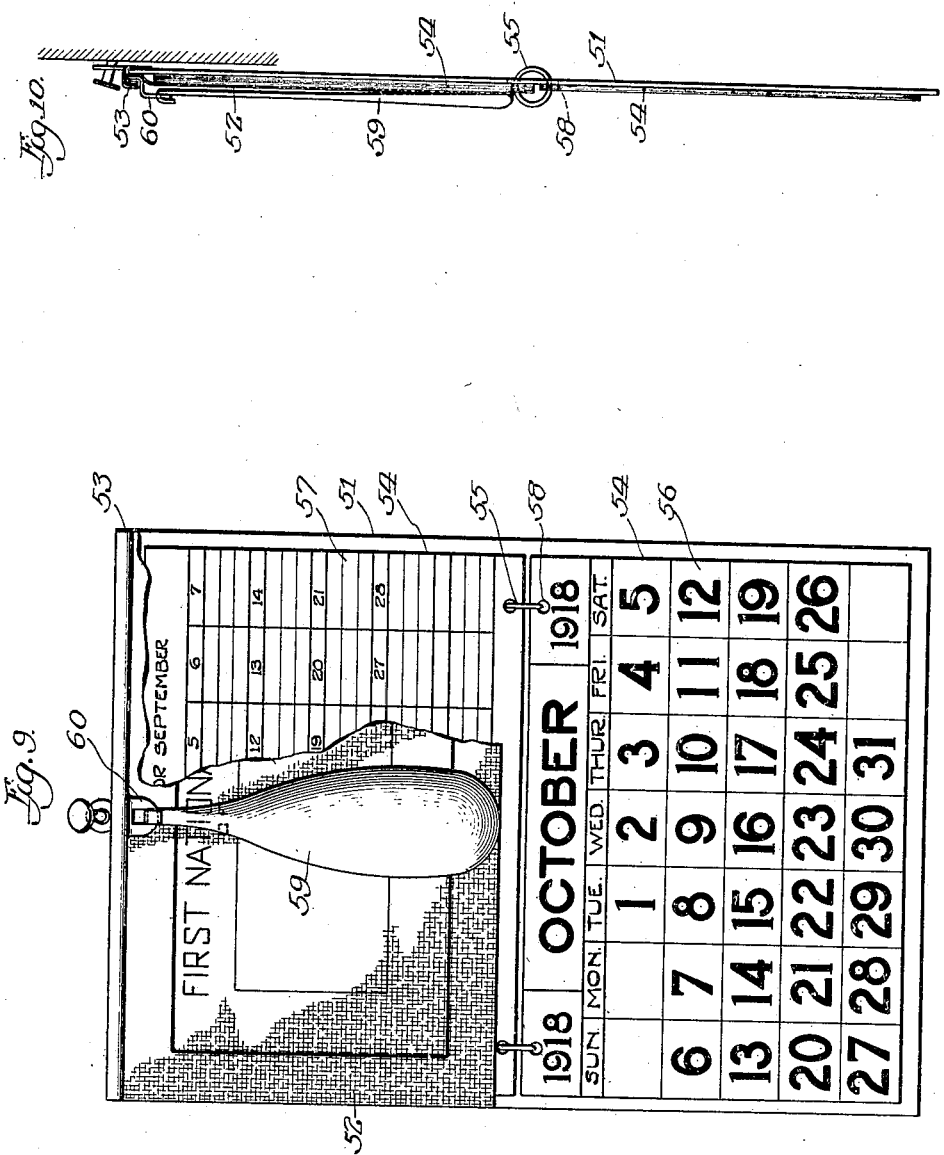

UNITED STATES PATENT OFFICE.

GEORGE H. DEATON, OF CHICAGO, ILLINOIS.

RECORD-CALENDAR.

1,368,905.　　　　　Specification of Letters Patent.　　Patented Feb. 15, 1921.

Application filed August 3, 1918. Serial No. 248,117.

*To all whom it may concern:*

Be it known that I, GEORGE H. DEATON, a citizen of the United States, residing at Chicago, in the county of Cook and State of Illinois, have invented certain new and useful Improvements in Record-Calendars, of which the following is a specification.

The invention has for its object the provision of a device for preserving private daily records of current events and comprises in combination a monthly calendar with the days of the current month and of the week in proper columnar relation associated with record sheets divided into spaces corresponding in number to and designated by the days of the month and suited for the entry of daily records of events occurring during that month. The manner of association of the record-calendar sheets is such that the calendar sheet is always visible for reference while the record sheet with the data thereon is hidden from view although readily accessible for the making of entries and for referring to entries previously made.

The present invention is an improvement upon a somewhat similar calendar formerly devised by me and patented November 17, 1914, as No. 1,117,802, and upon another similar calendar devised by me and patented July 31, 1917, No. 1,235,016; the device of the present invention being in many respects an improvement upon either of the calendars above referred to, lending itself to a wider range of usefulness, being more readily accessible for the making of entries and for referring to previous entries, making better provision for privacy of entries, and in every respect more suitable for the purposes for which such a record calendar is intended.

In the accompanying drawings and in the following detailed description predicated thereon, I have set forth several embodiments of the invention, each possessing the characteristics above referred to. Obviously, however, the invention is susceptible to other and varied modifications without departing from the spirit thereof, wherefore the drawings and description are to be taken in an illustrative rather than in an unnecessarily limiting sense. In the drawings—

Figure 1 is a front elevation of one embodiment of the invention with a portion of the cover sheet torn away;

Fig. 2 is a vertical medial section through Fig. 1;

Fig. 3 is a view similar to Fig. 1 showing a further embodiment;

Fig. 4 is a vertical medial section through Fig. 3;

Fig. 5 is a similar section slightly modified;

Fig. 6 is a view similar to Figs. 1 and 3 of a further embodiment of the invention;

Fig. 7 is a rear view of one of the record calendar sheets such as used in the embodiment shown in Fig. 6;

Fig. 8 is a vertical medial section through Fig. 6;

Fig. 9 is a view similar to Figs. 1, 3 and 6 showing a further modification of the invention; and Fig. 10 is a vertical medial section through Fig. 9.

Having reference to the drawings and particularly Figs. 1 and 2 thereof, the record calendar there shown comprises the backing sheet 11 and a cover sheet 12 hinged together at their upper edges as indicated at 13 so as to bind therebetween a series of record sheets 14 bearing outlined spaces corresponding in number to and designated by the days of the month, each space adapted for the entry of daily records occurring at that time. In order to maintain the cover sheet 12 in position upon the underlying record sheets 14 so as to prevent the said cover sheet from curling up or being disarranged by currents of air so as to disclose the underlying records, any suitable means are employed for holding the same down. For instance, the cover sheet may be weighted at its lower end as suggested in one of my previous patents referred to or some weighty article may be suspended by the calendar nail 15. In the present instance, I have shown a button hook 16 serving as a weight for this purpose.

Upon the lower portion of the backing sheet 11, adjacent the lower free edge of the cover sheet and record sheet, is suitably secured a pad of calendar sheets 17 in such manner as to be readily detached when out of date. As herein illustrated, staples 18 are employed for the purpose of such detachable fastening. It will be readily obvious that calendar sheets 17 may be formed as a part of the corresponding record sheet 14, being made detachable therefrom by means of a weakened perforated line as shown, for instance, in Figs. 3 and 4.

Having reference to Figs. 3 and 4 of the drawings, backing sheet 21 and a cover sheet 22 are shown as hinged together at their bottom edges as indicated at 23 upon an interposed pad of record sheets 24, the upper edges of the backing sheet of the cover sheet and of the record sheet being free. The record sheets 24, as in the former case, are equipped with outlined spaces corresponding to the days of the month for the entry of records of events, there being one record sheet 24 for each month of the year, said sheets being provided at their upper free edges with tabs as indicated at 25, the respective tabs bearing the name of the month, whereby any particular monthly sheet may be selected when desired to refer to the same, the cover sheet 22 and the record sheets lying in front of the one selected being allowed to drop to a pendant position thus leaving the selected sheet visible. Normally, the cover sheet 22 is held in an elevated position overlying the record sheet by means of an apertured ear 26 taking over the nail 27 upon which the suspending ear 28 of the backing sheet is hung. Alternative or supplemental securing means may be furnished in the way of hinged clips 29 pivoted to the backing sheet at 30.

Below that portion of the record calendar above described, is arranged a monthly calendar sheet 31 forming a continuation of the record sheets 24 and detachable therefrom by means of a perforated line 32 or, as shown in Fig. 5, the calendar sheets 31 may be separate from the record sheets 24 and stapled as indicated at 33 to a tab 34 forming an extension of the backing sheet 21.

Having reference to Figs. 6, 7 and 8 of the drawing, the backing sheet 41 has hinged to its upper portion at 42—42 the upper ends of a U-shaped bail including vertical portions 43 and horizontal portions 44. A pad of record calendar sheets 45 provided with eyelets 46 are attached to the horizontal portion 44 of the bail by means of rings 47 encircling the bail and the eyelets. Each of the record calendar sheets 45 has a width slightly less than the distance separating the vertical portions 43 of the bail whereby one of the sheets may be swung upwardly against the backing sheet for the writing of memorandum upon the rear of the sheet containing the outlined spaces for records as indicated at 48 and when the current month represented by the face of the record calendar sheet as indicated at 49 is out of date, said sheet may be swung upwardly through the bail and downwardly to a position at the rear of the pad of record calendar sheets 45, the bail 43, 44 swinging outwardly to approximately horizontal position in order to permit the record calendar sheet to pass through the same and drop to the rear. It will thus be observed that during the month when memoranda are being placed upon the record side of the sheet, the same is hidden from view and, likewise, at the end of the month, the sheet as an entirety is swung to a hidden position back of the pad. Privacy is thus at all times maintained.

Having reference to Figs. 9 and 10 of the drawing, the backing sheet 51 and the cover sheet 52 are hinged together at their upper edges at 53 while the pad of record calendar sheets 54 are hinged to the backing sheet by means of the rings 55 at points adjacent the lower free edge of the cover sheet 52. The front page of the record calendar sheet bears monthly calendar data as indicated at 56 while the reverse side thereof contains outlined spaces for record memorandum as indicated at 57 and as previously described. The upper edges of the sheets are provided with eyelets 58 through which the rings 55 engage. An individual record calendar sheet may be swung upwardly against the backing sheet for the making of memorandum on the rear thereof and, when out of date, the cover sheet 52 is swung to a forward substantially horizontal position and the out of date record calendar sheet, for the month of September for instance, is swung upwardly against the backing sheet and the cover sheet is then swung downwardly over the same. The cover sheet is held in this lowered position so as to maintain the record private and to prevent curling upward of the cover sheet by any suitable weighting means, that shown in the present instance being a pendant weight 59 hinged to the tab 60 of the calendar. Obviously any equivalent means may be employed for the purpose.

It will be readily appreciated that while several modifications have been shown herein, they possess characteristic features in common for affording ready use of the calendar and of the record for making memorandum and for preserving the same private. It will also be understood that while in some of the embodiments illustrated means have been provided forming a part of the device itself for holding the cover sheet in position, such means may not necessarily be a component part of the calendar construction but may be left for the user to apply as by means of hanging a buttonhook, a pair of scissors or other object above the cover sheet for the purpose.

Likewise, the record sheets of calendars constructed substantially as in Figs. 1 to 5 may bear on the back thereof other private data such as day book memoranda, or entries of cash receipts and disbursements, or inventories, for preservation and use in yearly calculations as to profit and loss of the business or the making of report for income tax.

I claim:

1. A record calendar comprising a backing sheet, a cover sheet, and a pad of interposed record sheets, all hinged together along the edge, and means independent of the cover sheet to hold the backing and cover sheet closed upon the record sheets to maintain their privacy.

2. A record calendar comprising a backing sheet, a cover sheet and a pad of interposed record sheets all secured together along one edge, means to suspend the same, and means independent of the cover sheet and depending from the point of suspension to hold the cover sheet closed upon the record sheets to maintain their privacy.

3. A record calendar comprising a backing sheet, a cover sheet, and a pad of interposed record sheets all secured together along one edge, means to suspend the same, and a weight depending from the point of suspension in front of the cover sheet to hold the latter closed upon the record sheets to maintain their privacy.

In testimony whereof I have hereunto signed my name in the presence of two subscribing witnesses.

GEO. H. DEATON.

Witnesses:
    MARY C. BROWER,
    L. T. GREIST.